United States Patent [19]

Jen et al.

[11] 4,387,180

[45] Jun. 7, 1983

[54] GLASS COMPOSITIONS

[75] Inventors: James S. Jen, Reynoldsburg; Marie R. P. Kalinowski, Granville, both of Ohio

[73] Assignee: Owens-Corning Fiberglas Corporation, Toledo, Ohio

[21] Appl. No.: 427,108

[22] Filed: Sep. 29, 1982

Related U.S. Application Data

[63] Continuation-in-part of Ser. No. 213,988, Dec. 8, 1980, abandoned.

[51] Int. Cl.³ .................. C03C 3/08; C03C 13/00; C04B 43/02; C08L 61/06
[52] U.S. Cl. .................................. 524/594; 252/62; 65/3.43; 65/9; 428/288; 428/366; 428/392; 501/36; 501/38; 501/66; 501/31; 524/611
[58] Field of Search .................. 501/35, 36, 38, 31, 501/66; 65/9, 3.43; 428/288, 366, 392; 524/594, 611; 252/62

[56] References Cited

U.S. PATENT DOCUMENTS

| | | | |
|---|---|---|---|
| 2,664,359 | 12/1953 | Dingledy | 501/38 |
| 3,853,569 | 12/1974 | Laurent et al. | 501/35 |
| 4,203,774 | 5/1980 | Battigelli et al. | 501/35 |
| 4,243,423 | 1/1981 | Hohman | 501/66 X |
| 4,325,724 | 4/1982 | Froberg | 501/35 X |

FOREIGN PATENT DOCUMENTS

| | | | |
|---|---|---|---|
| 9418 | 4/1980 | European Pat. Off. | 501/36 |
| 53-2515 | 1/1978 | Japan | 501/38 |

Primary Examiner—Helen M. McCarthy
Attorney, Agent, or Firm—Ronald C. Hudgens; Patrick P. Pacella; Philip R. Cloutier

[57] ABSTRACT

A glass batch, and a fiberizable glass composition, comprising 2 percent $B_2O_3$ is disclosed. The glass fibers have improved dry strength and water durability and have a surface boron concentration, in weight percent, of about 2.5.

9 Claims, 3 Drawing Figures

GLASS COMPOSITIONS

This is a continuation-in-part of application Ser. No. 213,988 filed Dec. 8, 1980, now abandoned.

TECHNICAL FIELD

This invention relates to improved glass compositions for fiberizable glass production.

In one of its more specific aspects, this invention relates to a fiberizable glass composition which provides improved dry strength of the fiber/binder matrix combination and water durability of the fiber itself.

BACKGROUND OF THE INVENTION

In the production of glass fibers usable in the form of "wool" batts for insulation purposes, one of the more widely used processes is a centrifugal process in which glass, at temperatures above its liquidus, is emitted through the apertures of a rapidly rotating spinner. The glass is further attenuated by contact with blasts of hot gases, such as steam or combustion gases. The attenuated fibers are contacted with a binder, frequently of a phenol-formaldehyde or phenol-urea type, and are collected on a moving conveyor in the form of batts which are subsequently dried and packaged for shipment as insulation.

The composition of the chemicals which are combined to form the "batch", which is subsequently melted to form the glass, is important for many reasons, one of which is cost and a second of which includes the general properties of the batt itself, particularly as evidenced by the dry strength and water durability of the fibers contained therein.

There now has been discovered a glass composition which is less expensive than conventional batches and which, more importantly, in the form of fibers, reacts with phenol-based binders to facilitate the adherence of the pack as a unit and, hence, improves dry strength. These fibers also possess improved water durability.

STATEMENT OF THE INVENTION

The composition of this invention, in its preferred embodiment, comprises a glass batch consisting essentially by weight of:

| Ingredient | Weight Percent |
|---|---|
| $SiO_2$ | 65.2 |
| $Fe_2O_3$ | 0.31 |
| $TiO_2$ | 0.08 |
| $Al_2O_3$ | 4.70 |
| CaO | 8.40 |
| SrO | 0.10 |
| MgO | 3.30 |
| $Na_2O$ | 15.00 |
| $K_2O$ | 0.93 |
| $B_2O_3$ | 2.00 |

DESCRIPTION OF THE DRAWINGS

The invention will be more easily understood by referring to the attached drawings in which.

DESCRIPTION OF THE INVENTION

Figure 1:
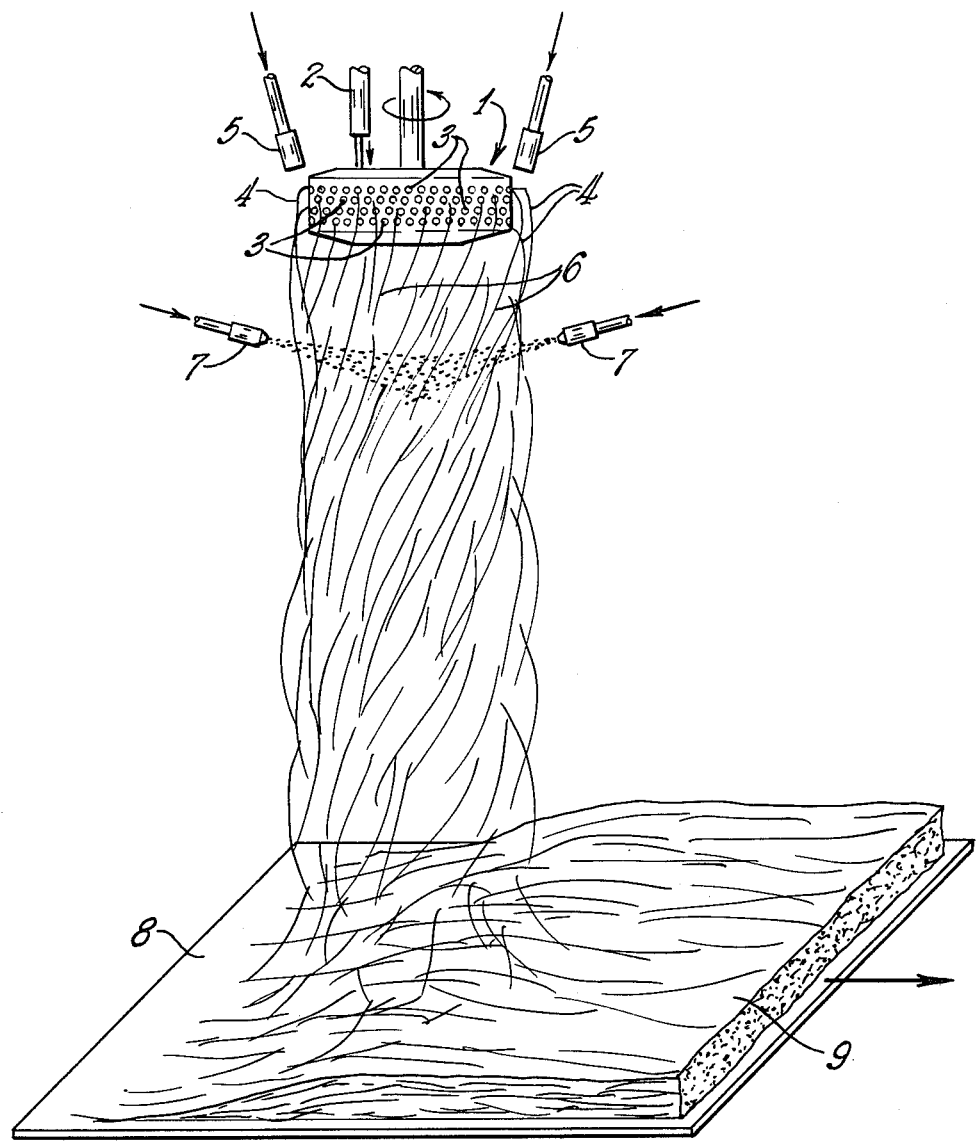
FIG. 1 depicts the method of producing the fibers of this composition.

Referring now to FIG. 1, there is shown a simplified fiber formation process, in elevation, in which glass is introduced into rotary spinner 1 through conduit 2, and glass fibers are ejected through apertures 3 as fibers 4. These fibers are further attenuated by hot gases originating in burners 5 and form a veil-like blanket 6 which falls towards movable belt 8. As the veil-like blanket moves past nozzles 7, it is sprayed with binder, after which it falls and forms a blanket 9 on movable belt 8.

In general, the composition of this invention can comprise a glass or a glass batch consisting essentially by weight of:

| Ingredient | Weight Percent |
|---|---|
| $SiO_2$ | 53.2 to 65.8 |
| $Fe_2O_3$ | 0.30 to 0.32 |
| $TiO_2$ | 0.075 to 0.085 |
| $Al_2O_3$ | 4.7 to 6.4 |
| CaO | 6.4 to 13.1 |
| SrO | 0.075 to 0.125 |
| MgO | 3.3 to 3.4 |
| $Na_2O$ | 15.0 to 20.0 |
| $K_2O$ | 0.91 to 0.93 |
| $B_2O_3$ | 1.25 to 2.55 |

Also according to this invention there is provided a method of improving the adherence between a phenol-based binder composition and glass fibers which comprises forming glass fibers from a batch composition and introducing the phenol-based binder composition into contact with the glass fibers, the batch composition consisting essentially of one of the compositions given above.

EXAMPLE 1

Various comparisons were made between the glass of this invention, B2, that is, the glass containing 2 weight percent $B_2O_3$ and other glasses containing greater, or lesser, amounts of $B_2O_3$. The analyses of these glasses were as follows:

| Composition found, Weight % | Glass Designation | | | | | | |
|---|---|---|---|---|---|---|---|
| | B0 | B1 | B2* | B3 | B4 | B5 | B6 |
| $SiO_2$ | 66.20 | 64.2 | 65.20 | 63.6 | 63.70 | 62.30 | 61.00 |
| $Fe_2O_3$ | 0.32 | — | 0.31 | — | 0.25 | 0.30 | 0.30 |
| $TiO_2$ | 0.05 | — | 0.08 | — | 0.06 | 0.08 | 0.07 |
| $Al_2O_3$ | 4.80 | 4.1 | 4.70 | 4.1 | 4.60 | 4.60 | 4.20 |
| CaO | 8.80 | 9.0 | 8.40 | 8.8 | 8.30 | 8.20 | 7.80 |
| SrO | 0.10 | — | 0.10 | — | 0.09 | 0.09 | 0.08 |
| MgO | 3.40 | 3.6 | 3.30 | 3.6 | 3.30 | 3.30 | 3.30 |
| $Na_2O$ | 15.00 | 14.8 | 15.00 | 14.7 | 15.00 | 14.50 | 14.40 |
| $K_2O$ | 0.99 | 1.0 | 0.93 | 1.0 | 0.91 | 0.91 | 0.91 |
| $B_2O_3$ | 0.00 | 1.0 | 2.00 | 3.0 | 3.90 | 5.80 | 7.90 |

*Glass of the invention.

Figure 2:
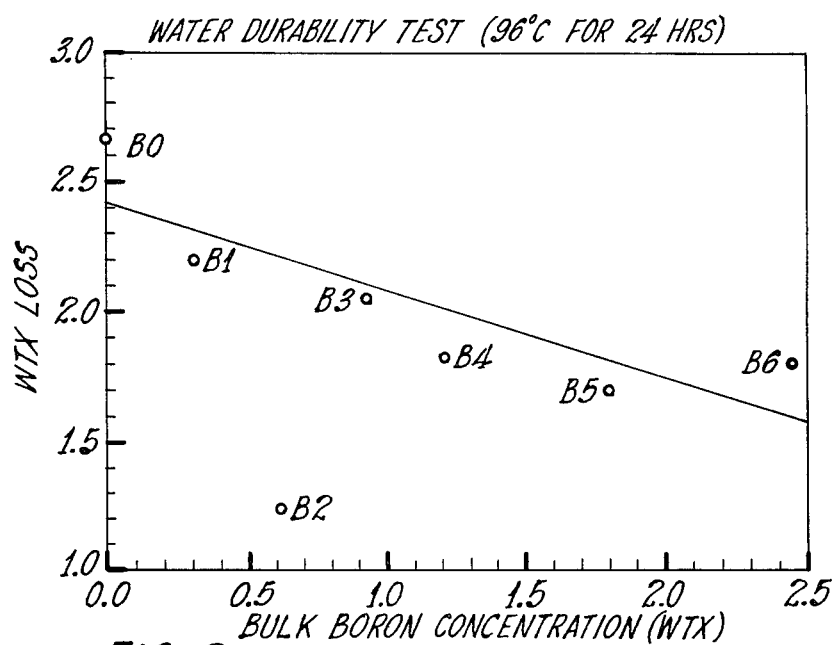
FIG. 2 is a graph of water durability for fibers for several glass compositions; and, FIG. 3 is a graph showing the relative strength of certain glass fiber-binder matrix for several glass compositions.

Fibers were made from all of the above glasses. In a water durability test, which was a modification of ASTM C225-73, all specimens were subjected under comparable conditions to water at 96° C. for 24 hours. The results are shown in FIG. 2. This figure indicates that the glass of this invention, B2, had a weight loss of about 1.3 weight percent, that is, a better water durability than any of the other glasses tested. In FIG. 2, the abscissa, "Bulk Boron Concentration," refers to the total boron concentration in the glass fiber and not merely to the boron concentration on the surface of the fiber.

EXAMPLE II

In separate determinations, the glass fiber surface concentration of $B_2O_3$ of the various glasses was determined as follows:

|  | Glass Designation | | | | | | |
| --- | --- | --- | --- | --- | --- | --- | --- |
|  | B0 | B1 | B2 | B3 | B4 | B5 | B6 |
| Surface Boron* Concentration (Weight %) | 0 | 0.6 | 2.5 | 0.9 | 1.3 | 1.5 | 2.1 |

*By surface boron concentration is meant concentration taken to a maximum depth of 100 20 A.

Figure 3:
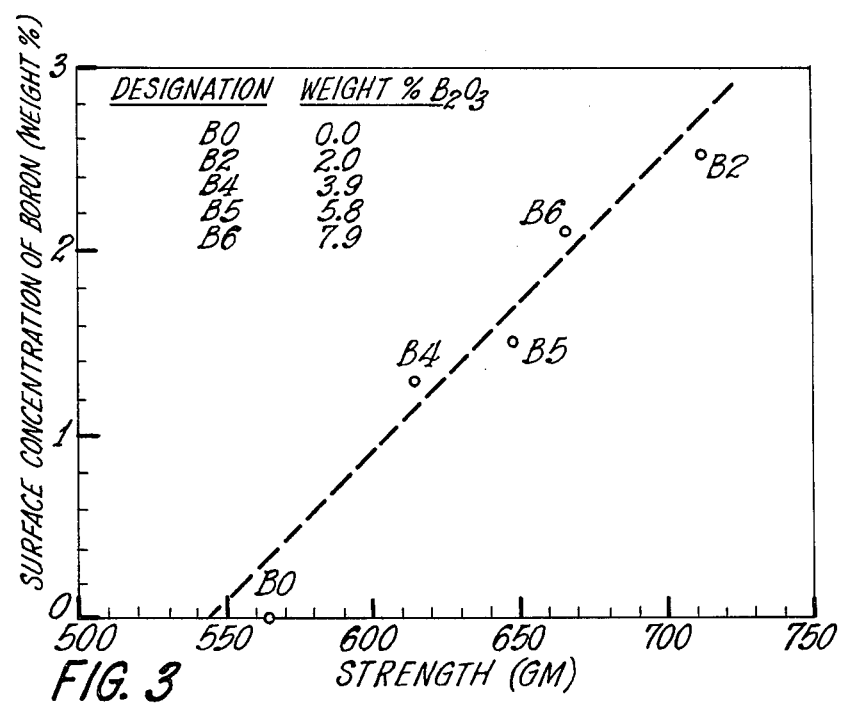

These glasses were subjected to comparable treatments and strength determinations made. In these treatments, a like number of strands of glass were coated with a binder comprising a phenol-urea reaction product (75.9 g phenol/36.4 g of 50% urea). This product was comparable to those well known and conventionally employed in the industry. The glass bundles were formed into relatively uniform, circular bundles of equal length. These bundles were then subjected to breaking tests until failure occurred. The results are shown on FIG. 3 which indicates that the inventive composition, B2 which had the highest surface concentration of boron, exhibited the greatest strength.

It will be evident from the foregoing that the inventive glass of the defined composition exhibits both improved dry strength and water durability.

It will be evident from the foregoing that various modifications can be made to this invention. Such, however, are considered within the scope of the invention.

We claim:

1. A glass composition consisting essentially by weight percent of:
$SiO_2$:53.2 to 65.8
$Fe_2O_3$:0.30 to 0.32
$TiO_2$:0.075 to 0.085
$Al_2O_3$:4.7 to 6.4
$CaO$:6.4 to 13.1
$SrO$:0.075 to 0.125
$MgO$:3.3 to 3.4
$Na_2O$:15.0 to 20.0
$K_2O$:0.91 to 0.93
$B_2O_3$:1.25 to 2.55

2. The glass composition of claim 1 consisting essentially by weight percent of:
$SiO_2$: 65.20
$Fe_2O$:0.31
$TiO_2$:0.08
$Al_2O_3$:4.70
$CaO$:8.40
$SrO$:0.10
$MgO$:3.30
$Na_2O$:15.00
$K_2O$:0.93
$B_2O_3$:2.00

3. The glass composition of claim 1 in which the weight percent $B_2O_3$ is 2.0.

4. Glass fiber produced from the glass composition of claim 1 and having a surface boron concentration of about 2.5 weight percent.

5. Glass fibers as defined in claim 4 and having a water durability weight loss of about 1.3 weight percent.

6. Glass fibers as defined in claim 4 having a phenol-formaldehyde type or phenol-urea type binder in contact therewith.

7. Glass fibers as defined in claim 6 in the form of a pack of fibers.

8. A method of improving the adherence between a phenol-formaldehyde type or phenol-urea type binder and glass fibers which comprises forming said glass fibers of the fibers defined in claim 4.

9. A method of improving the adherence between a phenol-formaldehyde type or phenol-urea type binder and glass fibers which comprises forming said glass fibers of the fibers defined in claim 5.

* * * * *

UNITED STATES PATENT AND TRADEMARK OFFICE
CERTIFICATE OF CORRECTION

PATENT NO. : 4,387,180

DATED : June 7, 1983

INVENTOR(S) : James S. Jen & Marie R. P. Kalinowski

It is certified that error appears in the above—identified patent and that said Letters Patent is hereby corrected as shown below:

On front page of patent, item 54 should be changed to:

> FIBERIZABLE BORON-CONTAINING SILICATE GLASS OF IMPROVED ADHERENCE IN CONTACT WITH PHENOL-BASED BINDERS

At column 1, line 1, the title of the patent should be changed to:

> FIBERIZABLE BORON-CONTAINING SILICATE GLASS OF IMPROVED ADHERENCE IN CONTACT WITH PHENOL-BASED BINDERS

At Column 3, line 18 should be changed to read: "of $100°A$"

At column 3, line 40 should be changed to read:

> "1. A fiberizable glass composition capable of improved adherence in contact with phenol-formaldehyde and phenol-urea type binder compositions and consisting essentially by"

At column 4, line 13 should be changed to read: "$Fe_2O_3$:0.31"

Signed and Sealed this

Thirty-first Day of July 1984

[SEAL]

Attest:

GERALD J. MOSSINGHOFF

Attesting Officer

Commissioner of Patents and Trademarks